United States Patent [19]
Fehn

[11] Patent Number: 5,814,383
[45] Date of Patent: Sep. 29, 1998

[54] CONTAINERS WITH IMPROVED CREASE-CRACK RESISTANCE

[75] Inventor: Gregory M. Fehn, Barrington, Ill.

[73] Assignee: Continental Plastic Containers, Inc., Norwalk, Conn.

[21] Appl. No.: 685,413

[22] Filed: Jul. 23, 1996

[51] Int. Cl.$^6$ .................................................. B29D 22/00
[52] U.S. Cl. ...................... 428/35.7; 215/12.2; 215/370; 215/379; 215/DIG. 6; 220/455; 220/660; 220/DIG. 11; 220/DIG. 12; 220/DIG. 14; 264/241; 264/331.17
[58] Field of Search .................... 428/35.7; 220/DIG. 14, 220/455, 660, DIG. 11, DIG. 12; 264/241, 331.17; 215/12.2, 370, 379, DIG. 6

[56] References Cited

U.S. PATENT DOCUMENTS

| | | | |
|---|---|---|---|
| 4,567,069 | 1/1986 | Jabarin | 428/35 |
| 5,681,628 | 10/1997 | Niederst et al. | 428/35.7 |
| 5,702,786 | 4/1996 | Robichaud | 428/35.7 |

*Primary Examiner*—Christopher Raimund
*Attorney, Agent, or Firm*—Eugene F. Friedman

[57] ABSTRACT

A container with improved crease-crack resistance and a method of making that type of container. The container utilizes a layer of a soft plastic on its exterior to control cracking at outward creases. When the container holds motor oil, the oil itself may plasticize the stiff material on the container's interior to preclude inward crease cracking. In this case, the stiff layer should have a sufficient thickness that an adequate amount of material remains unaffected by the oil and does not lose its rigidity or jeopardize the container's structural integrity. Where the contents do not provide the requisite improvement in inward crease cracking or would completely soften the stiff layer, then the container has a separate, soft, third layer of plastic on the interior of the container. The softness of this layer protects against inward crease cracking. It may also protect the stiff layer from softening by the bottle's contents. Making the container involves forming the substantially stiff layer that gives the container its shape and rigidity. A soft, outer layer should also be formed for protection against outward crease cracking. If the intended contents of the container will either not plasticize the inner surface of the stiff layer or will cause excessive softening, then a third, thin, layer must be formed on the container's interior. This soft layer then guards against inward crease cracking.

162 Claims, 2 Drawing Sheets

CONTAINERS WITH IMPROVED CREASE-CRACK RESISTANCE

BACKGROUND

Plastic containers must generally attempt to satisfy a variety of criteria to show their complete utility. These criteria will, of course, vary from one container to the next depending upon the substances placed in the containers, the filling conditions, for example, "hot filled", and the conditions which the filled containers will experience during storage while both empty and filled. Oftentimes, the criteria attempt to impose conflicting requirements on the structure of the containers. For example, a container should have enough strength to facilely hold its contents under the anticipated conditions of storage. This calls for a clearly adequate amount of resin and thus unquestionably thick walls to remain intact until the contents' departure. Yet, merely adding more resin to increase the walls may merely make the container so expensive that it cannot find economical use whatsoever. Further, the use of a stiff resin may give the container sufficient rigidity to support the loads it will experience in its lifetime. This same rigidity, however, may cause the container to become more susceptible to breaking when dropped from only a moderate height.

Additionally, containers may display flaws under circumstances that elude comprehension and, thus, solution. While the general utility of such containers demands their continued use, their shortcomings of unknown origins decreases their economy of use as well as their appreciation.

One such malady has long afflicted the plastic bottles that purvey motor oil to the general public. When stored in stacks under warmer conditions or with excessive vertical loading, these bottles display a slight, occasional, but very disturbing tendency to leak their contents into their environs. The unquestionable superiority of plastic motor oil containers over prior competitors using other types of materials has resulted in their total domination of the market. However, the imperfection alluded to above has made them a major source of aggravation notwithstanding their demonstrated desirability over all other available oil containers. Exacerbating the problem has been the fact that even the cause of the occasional failures of the oil containers has not submitted to a reasonable understanding let alone solution.

SUMMARY

Plastic motor-oil bottles, when stacked for temporary storage often will deform in a manner resulting in creases in their sidewalls. The weight of the filled containers sitting on other bottles causes the latter to develop "accordion" pleats, or creases. Warm temperatures or excessive vertical loading appears to permit the development of the creases which fold both inwards and outwards. A careful study has now indicated that the creases develop cracks which, as they propagate, allow the escape of the bottle's contents. A major and fascinating result of this effort has revealed that the destructive cracks occur almost exclusively at the outward creases. Although the bottles develop inward creases, virtually never do they crack and allow the exit of the motor oil.

Further study has suggested a plausible rationale for the observed phenomena. The interior surface appears to absorb the oil and, as a consequence, soften. FIG. 1 plots test results for two types of commonly used polyethylene placed in motor oil. Curves 11 and 12 indicate that, after about 250 days, the polyethylenes having the respective densities of 0.955 and 0.960 gm./cc. absorb approximately 3 percent of their weight of the oil. Concomitantly, the curves 13 and 14 show a loss of about one third of the plastics' original vertical strength upon the absorption of the oil.

Accordingly, the interior surface of bottles holding oil absorbs that oil and becomes softer. At inward creases, the inner surface needs to stretch to avoid cracking. The softened condition of this surface, because of its oil absorption, allows it to stretch at an inward crease and almost totally eliminate cracking at such creases. The exterior surface which does not contact the oil thus retains its original stiffness. At outward creases, this surface often cannot undergo adequate stretching. As a consequence, the surface will often crack which may allow the contents to escape.

Discovering that the bottle interior's acquired softness precludes most inward-crease cracking leads to several beneficial developments. First, it suggests, for the prevention of crease cracking, a focus upon the exterior surface of a plastic container for motor oil. Providing a thin layer of relatively soft resin on the outside should control the outward crease cracking in much the same fashion as the softened plastic on the inside obviates inward crease cracking.

Further, the bottle may now utilize a substantially stiffer resin for its plastic; the softened interior surface and the layer of softer resin on the outside should control all crease cracking notwithstanding the stiffness of the base material. The stiffer material permits a thinner wall on the container without the loss of the required structural strength. Thus, requiring less starting material, it portends a cost reduction for producing the container. At the minimum, it can compensate, at least in part, for the additional cost of providing a separate (and generally softer) layer on the container's exterior.

The knowledge gleaned from avoiding crease cracking in motor-oil bottles also leads to a solution of crease cracking in plastic containers not holding oil. A thin layer of soft plastic on the exterior will limit outward crease cracking. Where the bottle's contents do not soften the interior surface, then a second thin layer of plastic there will similarly control inward crease cracking. Again, this permits the use of a stiffer resin as the bottle's base resin with the advantages discussed above. If the expected contents of the container may attack this second, thin layer, then a film of fluorinated polymer towards the interior may protect it.

Stated in more general terms, a container for oil has a wall defining an interior and an exterior. At least a part of the wall comprises a plurality of layers. In this part of the wall, a first substantially stiff layer lies in close proximity to the container's interior and is formed from a polymer. This polymer, when on the interior surface of the first layer and in close proximity to the oil, absorbs the oil. After absorbing the oil, the polymer displays substantially less stiffness than when out of close proximity to the oil. The first layer has a sufficient thickness so that the part of the first layer located layer away from the interior of the container has greater stiffness than the interior surface of the first layer when the first layer is in close proximity to the oil. Desirably, the part of the first layer located from the container's interior retains substantially all of its original stiffness.

A second substantially continuous layer occurs at the portion of the part of the wall wherever the first layer is found. At this portion of the wall, the second layer lies toward the exterior of the container from the first layer. The second layer has substantially less stiffness than the part of the first layer located away from the interior of the container. Typically, the first, or stiff, layer with the soft surface lies on the container's interior while the second layer has a location on the outside.

The container may hold some fluid other than oil. In this instance, the polymer of the first layer, when in close proximity to the fluid, should display less susceptibility to crease cracking than when away from the contained fluid.

The container's contents, in various situations, may not be counted upon to help avoid crease cracking. This may occur when the intended contents are simply not known or, if known, will not have the desired effect. In this situation, the container may have a third layer occurring at the portion of the part of the wall wherever the first layer is found. There, it has a location toward the interior of the container from the first layer. To accomplish its objective, the third layer should display substantially less susceptibility to crease cracking than the first layer. The two crease crack resistant layers help maintain the container's integrity. Most often, the two layers accomplish this objective by having substantially less stiffness than the first layer. The reduced stiffness, on either side of the stiff resin, effectively controls the crease crack problem. Optionally, the container's wall may have a continuous film of fluorinated polymer. This film may serve to protect the inner layer from attack from the material held by the container.

A container for oil will have a wall defining an interior and an exterior. A method for molding that container includes forming a first substantially stiff layer in close proximity to the interior of the container from a polymer. The polymer, when on the interior surface of the layer and in close proximity to the oil, absorbs the oil and, after absorbing the oil, displays substantially less stiffness than when out of close proximity to the oil. The first layer is formed sufficiently thick so that the part of the layer located away from the interior of the container has greater stiffness than the interior surface of the first layer when the first layer is not in close proximity to the oil.

The method also involves forming a second substantially continuous layer at the portion of the wall wherever the first layer occurs. There, it lies toward the exterior of the container from the first layer. The second layer is formed with less stiffness than the part of the first layer located away from the interior of the container. This softness of the second, or outer, layer reduces the cracking of the container at outward creases.

In more general terms, the resulting container may be designed to contain a particular fluid. The molding of this container should then form the substantially stiff inner layer from a polymer which, in close proximity, if not in immediate contact, with the fluid displays less susceptibility to crease cracking. Where the fluid will not have this effect upon the stiff layer, then the method also involves forming a third layer on the interior of the first, or stiff, layer. This third layer must, when formed, display less susceptibility to crease cracking than the stiff, now inner, layer. Typically, the third layer accomplishes this objective by displaying less hardness than the first layer. A further step may involve forming a continuous film of fluorinated polymer towards the interior from the third layer.

DETAILED DESCRIPTION

Figure 1:
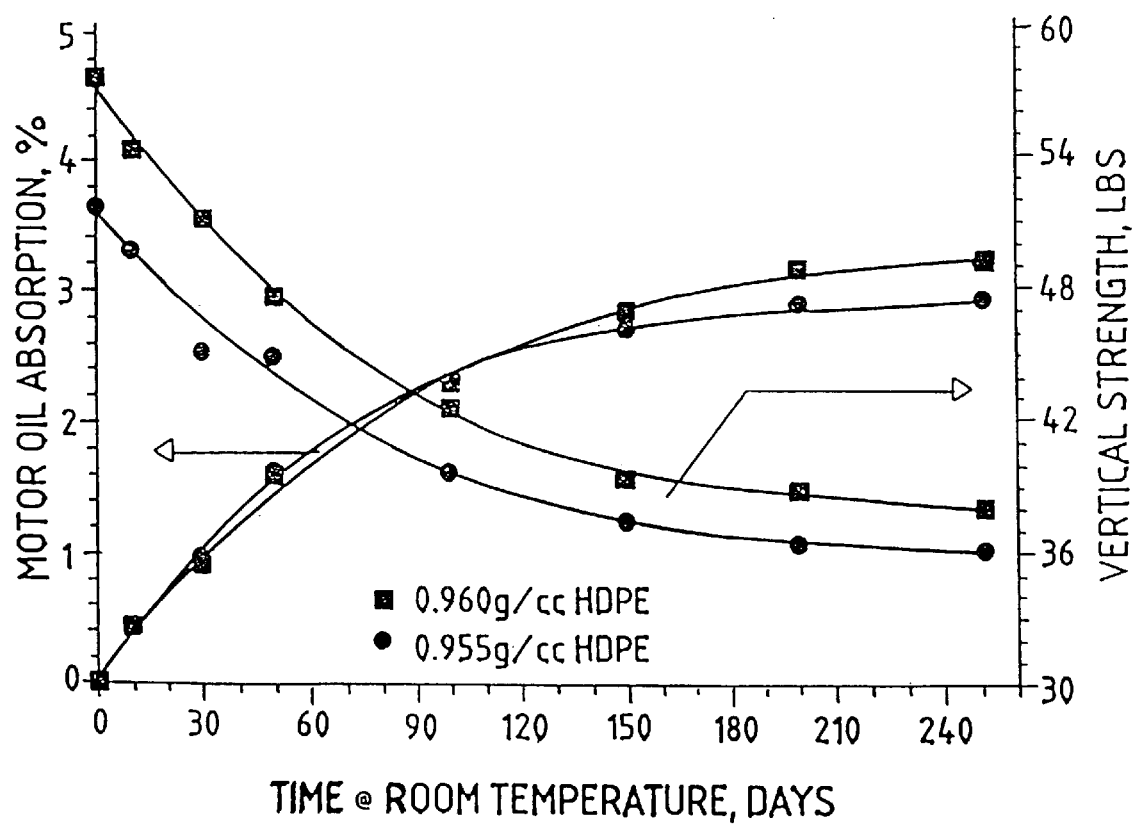
FIG. 1 graphs the oil absorption and vertical strength of two polyethylene plastics as a function of time.
Figure 2:
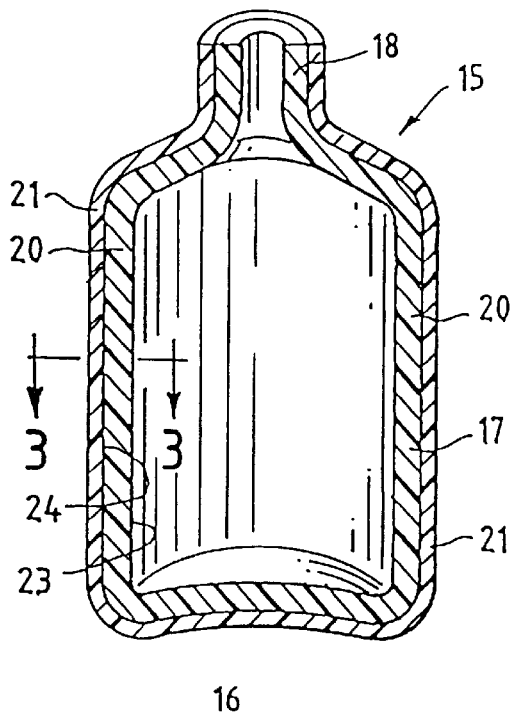
FIG. 2 gives a cross-sectional view of a container formed from two layers of plastic with the outer layer and the innermost portion of the inner layer displaying less susceptibility to crease cracking, generally because of their softness.

FIG. 2 shows a container generally at 15 that will avoid crease cracking when it contains a fluid that will plasticize the plastic it contacts. The container 15 includes the bottom 16, the side 17, and the neck 18 at the top.

Figure 3:
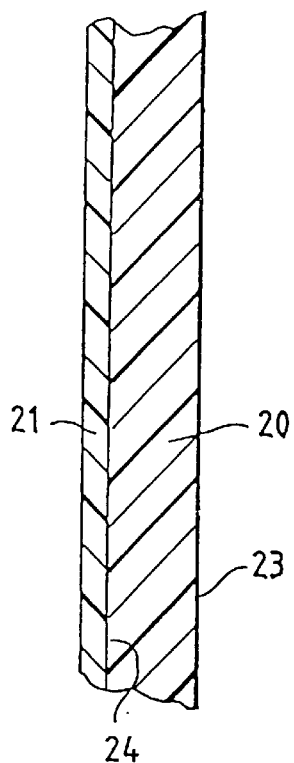
FIG. 3 provides an enlarged cross-sectional view along the line 3—3 of the layers of plastic forming the container of FIG. 2.

As seen in FIGS. 2 and 3, the construction of the container 15 utilizes the thicker interior layer 20 covered by the thinner exterior layer 21. The construction of the container 15 in FIGS. 2 and 3 proves particularly propitious for holding fluids that will plasticize, or soften, the resin of the inner layer 20. Motor oil provides a particular example of a liquid having this effect upon polyethylene. The typical current motor oil bottle utilizes high density polyethylene with a density of approximately 0.955 gm./cc. The choice of this material represents a compromise between the stiffness that will allow the container to maintain its shape in use and possibly under abuse. On the other hand, it provides a degree of flexibility suggested by considerations of impact resistance. A higher density polyethylene would provide greater stiffness and structural strength. However, it would entail a concomitant loss of flexibility and impact resistance. A polyethylene with a density less than about 0.955 gm./cc. would produce the opposite results. While representing the current compromise, bottles having HDPE with a density of 0.955 gm./cc. still suffer from disturbing cracking with accompanying loss of contents.

The selection of the 0.955 gm./cc. HDPE occurred without even an awareness of the phenomenon of crease cracking in the motor oil bottles, not to mention the effect of the particular plastic upon it. As a consequence, the choice of the plastic made no accommodation for or effort to ameliorate the problem of crease cracking.

The structures shown in FIGS. 2 and 3, however, as well as in the other figures, provide containers that avoid the deleterious leaking of the prior bottles. Thus, when the container 15 holds motor oil, the liquid will actually plasticize and soften the portion 23 of the inner layer 20 lying closest to the bottle's interior. This softening minimizes or even eliminates crease cracking on inward folds that may occur in the wall of the container 15.

Typically, the portion of the inner layer 20 lying away from the interior of the container 15 and especially toward the interface 24 between the inner layer 20 and the outer layer 21 should remain substantially stiff, notwithstanding the softening of the interior surface 23 of the inner layer 20. This stiffness, of course, provides the structural rigidity of the container 15.

An understanding of the interaction between the contents of the container 15 and the interior layer 20 shows that the absorption constitutes a continuing, kinetic process with the molecules of oil migrating from the interior surface 23 toward the exterior of the container 15. This process continues during all the time the container 15 holds the motor oil. As a result, the softening of the interior layer 20 starts at the interior surface 23 and works its way toward the exterior layer 21. If the process continued for a sufficient period of time, motor oil would plasticize and soften the entire interior layer 20 and seriously reduce that layer's rigidity and thus the structural integrity of the container 15. However, this potential jeopardization of the container's structural integrity does not, in reality, constitute an actual danger if the oil migrates through the inner layer 20 with sufficient slowness. The container remains acceptable if the inner layer 20 retains substantial stiffness, notwithstanding the migration of the oil, for a somewhat greater period of time then that typically required to assure the sale of the container with the oil. Desirably, of course, at least a portion of the inner layer 20 near the interface 24 should, for the entire lifetime of the container 15 with the oil inside, retain substantially the same stiffness it had before the container 15 ever received any of the plasticizing oil.

Within these limitations, the structure of the container 15 as shown in FIGS. 2 and 3 permits the selection of the layers 20 and 21 to achieve a reliable container in light of the contents that it will hold. Thus, again for the case of motor oil, the HDPE for the inner layer 20 when selected, should typically have a density of about at least the 0.955 gm./cc. previously used. This will provide the structural rigidity and strength that has generally met with satisfaction.

However, the 0.955 gm./cc density constituted a compromise between structural strength and rigidity on the one hand as opposed to the softness on the other to provide impact resistance and hopefully minimize leaking. An awareness of the soft external layer 21 and of the effect of the liquid on the interior surface 23 of the inner layer 20 permits a wider selection of the material for the interior layer 20. Thus, the interior layer 20 may have even greater density and thus rigidity. The altered interior surface 23 and the exterior layer 21 will provide the protection against impact damage and cracking notwithstanding the greater stiffness of the interior layer 20. Thus, instead of the density of 0.955 gm./cc., the interior layer 20 may have a density of 0.957 gm./cc., 960 gm./cc., or even higher, with its concomitant greater rigidity.

Increasing the stiffness of the inner layer 20 portends an additional benefit. The greater stiffness may permit the inner layer 20 to provide the structural rigidity with less material than previously employed. In other words, even though the inner layer 20 may have a reduced thickness, its greater stiffness may well, in particular, provide the requisite structural strength.

Clearly, to provide protection against crease cracking on outer folds, the exterior layer 21 should display less susceptibility to crease cracking than the interior layer 20. Where both have a composition of HDPE, the outer layer 21 will achieve its relative softness by having a lower density than the inner layer 20. For a polyethylene exterior layer 21, it should display sufficient softness to avoid crease cracking at outward folds of the container wall 17. This would suggest that it have the softness of an HDPE polymer with a density less than the 0.955 gm./cc. previously used for motor oil containers. In fact, its density may fall to or even below 0.950 gm./cc. with its accompanying increase in softness. Even greater protection against crease cracking should result.

FIGS. 2 and 3 show the container 15 in its usual configuration. This places the thicker layer 20 on the interior of the container 15 and the thinner layer 21 on the exterior. This permits the layers to most readily achieve their intended functions. Thus, the interior surface 23 of the interior layer 20 may directly contact the contents of the container 15 to undergo the softening that will help prevent the crease cracking at inward folds. Similarly, the location of the exterior layer 21 on the outside of the container 15 allows it to inhibit all crease cracking at outward folds. One or more additional layers on the exterior of the container 15 will prove acceptable so long as they do not interfere with the protective effect of the layer 21. On the inside of the container 15, however, an additional layer could prohibit the migration of oil to the layer 20 and inhibit its softening effect. Clearly, this defeats the crease-cracking protection created by the plasticizing of the interior surface 23 by the container's contents. A layer on the interior of the container 15 which would not have such an inhibiting effect would, however, prove acceptable. Additionally, the container 15 may include additional layers between the inner layer 20 and the outer layer 21. These may take the form of barrier, adhesive, or even regrind layers.

Similar considerations permit conclusions about the relative widths of the layers shown in FIGS. 2 and 3. Since the inner layer 20 provides the structural strength for the container 11, it will generally contribute a majority of the thickness of the wall 17. Generally, the exterior layer 21 can provide its protection against crease cracking if it possesses even as little as 15 percent or less of the wall's thickness. In this instance, the inner layer 20 would provide up to 85 percent of the thickness. Of this, the interior surface 23, having softened in the presence of the container's contents, protects against crease cracking at inward folds. The remainder of the interior layer 20 then provides the structural rigidity for the container 15.

The above discussion has focused upon the use HDPE for both of the inner and outer layers 20 and 21 in FIGS. 2 and 3. Clearly, the two polyethylene polymers for these layers must differ from each other in order to accomplish their respective functions for the container 15. Furthermore, polymers other then polyethylene may also find use for one or more layers of the container. As an example, polypropylene displays less susceptibility to crease cracking than polyethylene. Accordingly, it may find use as the outer layer 21 on the container 15 in FIGS. 2 and 3. Again, typically, it would constitute a small portion of the overall thickness of the container 15. Additionally, polypropylene may, at low density, provide some protection against impact failure.

Other benefits may results from the structure of the container 15 in FIGS. 2 and 3. Thus, as suggested above, the addition of the softer exterior layer 21 may, in addition to avoiding crease cracking at outward folds, also improve the impact resistance of the container. Separately, the combination of the interior surface 23 with the contents of the container 15 may reduce the environmental stress cracking caused by the attack of the contents upon the container wall 17. A careful selection of the resins used to formulate the container 15 can help achieve these additional advantages where desired.

Unfortunately, various combinations of the interior layer 20 with the contents of the container 15 may not permit the latter to plasticize or soften the former to reduce crease cracking at inward folds. This would naturally occur where the container holds a polar liquid which would not in any way combine with the resin of the layer 20. However, the structure shown in FIG. 4 for the container wall shown generally at 27 can overcome this shortcoming and provide the desired crease-crack resistance without requiring the bottle's contents to condition the container's wall 27. The wall section 27 includes first the middle, relatively stiff layer 28 that may have the same composition as the inner layer 20 in FIGS. 2 and 3. The stiffness of the middle layer 28 provides the structural rigidity and integrity of the container incorporating the wall section 27.

Furthermore, similar to the prior two figures, the wall section 27 includes the outer layer 29 which displays less crease-cracking susceptibility than the middle layer 28. Typically, it accomplishes this objective by possessing less stiffness than the middle layer 28. The outer layer 29 thus serves to prevent or at least reduce crease cracking at outward folds of the wall section 27.

Lastly, the inner layer 30 protects the wall section 27 from crease cracking at inward folds. It does this in the same fashion as the outer layer 29 does for outward folds. In fact, the inner layer 30 may have the same or a very similar composition as the exterior layer 29. Or, it may have a different composition but still protect against inward-fold crease cracking.

However, the inner layer 30 must have a composition that differs from the polymer used for the middle layer 28 since the two have very different purposes. Similar to the discussion concerning the inner and outer layers 20 and 21 of FIGS. 2 and 3, the polymers of the inner layer 30 and the middle layer 28 of the wall section 27 in FIG. 4 may differ from each other in fundamental chemical composition or merely in their densities. Thus, where the middle layer 28 takes the form of HDPE, the inner layer 30 may utilize a polypropylene resin. In the case of a density differential, the middle layer 28 may have a density of 0.955 gm./cc., 0.957 gm./cc., 0.960 gm./cc. or higher while the HDPE of the inner layer 30 has a density of less than about 0.955 gm./cc., as low as 0.950 gm/cc., or lower.

Figure 4:
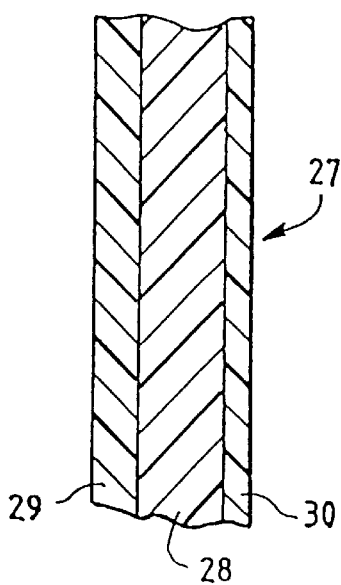
FIG. 4 gives a cross-sectional view of a container wall similar to that of FIG. 3 but in which an additional layer of plastic on the interior of the container wall protects against cracking at inward creases.

The inner layer protective layer 30 may differ in its thickness from the outer layer 29 as shown in FIG. 4. Alternately, it may have the same thickness. In any event, neither typically provides more than about 15 percent of the thickness of the wall section 27.

The structure of FIG. 4 can also find use where the inner layer 20 of FIGS. 2 and 3 can absorb enough of the bottle's contents to become excessively soft. The middle layer, when this occurs, loses its ability to provide the requiste stiffness and structural rigidity. This can happen over a short period of time where the relative natures of the polymer and the contents quickly destroy the stiffness of the inner layer 20. Alternately, as discussed above, the absorption of oil, for example, by the inner layer 20 constitutes a kinetic phemonon. The use of the contents in the container 15 must occur sufficiently quickly so that a density gradiant of the oil across the inner layer 20 remains throughout the container's use. This will allow the outer surface 24 of the inner layer to remain sufficiently stiff to provide the necessary structural rigidity. If the contents migrate too quickly, all of the inner layer 20 will lose its strength and allow the container to collapse or suffer some other deterioration.

In this instance, the structure of FIG. 4 will find use even when the middle layer softens from the bottle's contents. Here, the inner layer 30 protects the middle layer 28 from an attach by the container's contents. In other words, no softening of the middle layer should occur. The inner layer prevents an attack on the middle layer 28 by the container's contents while, at the same time, providing crease-crack resistance.

Figure 5:
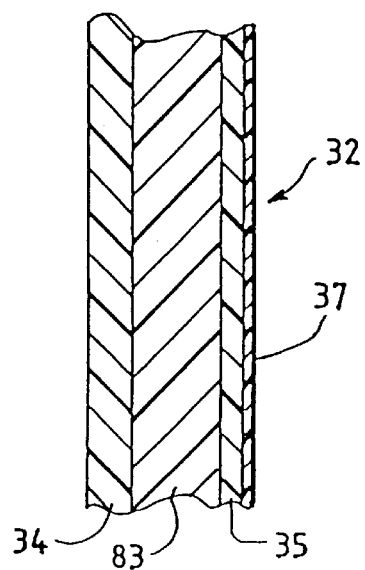
FIG. 5 shows, in a cross-sectional view, a container wall similar to that of FIG. 4 but having a film of flourinated polymer to protect the interior layer of the container wall.

FIG. 5 shows a wall section generally at 32 having a structure very similar to the wall 27 of FIG. 4. Again, it has the middle layer 33 to provide structural strength, rigidity, and integrity. The outer layer 34 and the inner layer 35 then guard against outward and inward crease cracking respectively. Again, they typically accomplish this by possessing less stiffness then the middle layer 33, although a different composition may accomplish the same objective.

In addition to the three layers 33 to 35, the wall section 32 has the film 37 of fluorinated polymer adhered to the interior surface of the inner layer 35. This film 37 may simply result from the fluorination of the inner layer 35 in the usual fashion. The fluorinated film 37 serves to prevent an attack on the inner layer 35 by various chemicals that the container may hold. Additionally, it may serve as a barrier to other chemicals passing through the wall 32. These can include oxygen, moisture, and various contaminants.

As seen in FIG. 2, the multilayer structure having the inner layer 20 and the outer layer 21 occurs throughout the entire container 15. This would appear to represent the most facile way of making a bottle. However, the multilayered structure need only occur where the danger of crease cracking exists. In the other areas, the container 15 for example might only contain the inner layer 20 to provide the necessary structural rigidity.

Accordingly, what is claimed is:

1. A substantially form retaining container for oil having a wall defining an interior and an exterior, at least a part of said wall comprising a plurality of layers including:

(A) a first relatively stiff layer in close proximity to said interior of said container and formed from a polymer; said polymer, when on the interior surface of said layer and in close proximity to said oil, absorbing said oil, and after absorbing said oil, displaying less stiffness than when out of close proximity to said oil, said first layer being sufficiently thick so that the part of said first layer located layer away from said interior of said container has greater stiffness than said interior surface of said first layer when said first layer is in close proximity to said oil; and (B) a second substantially continuous layer occurring at the portion of said part of said wall wherever said first layer occurs and being located, at said portion, toward the exterior of said container from said first layer, said second layer having less stiffness than said part of said first layer located away from said interior of said container.

2. The container of claim 1 wherein the part of said first layer located away from said interior of said container has substantially the same stiffness when said first layer is in close proximity to said oil as when said first layer is not in close proximity to said oil.

3. The container of claim 1 wherein said first layer is in contact with said interior of said container.

4. The container of claim 3 wherein said oil is a plasticizer for said polymer.

5. The container of claim 4 wherein said first layer forms the majority of the thickness of said part of said wall.

6. The container of claim 5 wherein said polymer of said first layer is a polyethylene.

7. The container of claim 6 wherein said second layer is formed from a polyethylene polymer.

8. The container of claim 7 wherein said first layer has a greater density than said second layer.

9. The container of claim 8 wherein said second layer has a density less than about 0.955 gm./cc. and said first layer has a density greater than about 0.955 gm./cc.

10. The container of claim 9 wherein said second layer has no more than about 15 percent of the thickness of said part of said wall.

11. The container of claim 10 wherein said second layer forms the exterior of said part of said wall.

12. The container of claim 10 wherein said first layer has a density of at least about 0.957 gm./cc.

13. The container of claim 12 wherein said first layer has a density of at least about 0.960 gm./cc.

14. The container of claim 12 wherein said second layer has a density of no more than about 0.950 gm./cc.

15. The container of claim 14 wherein said oil is motor oil.

16. The container of claim 10 wherein said part of said wall constitutes substantially all of said wall.

17. The container of claim 10 wherein said second layer has greater impact resistance than said first layer when said first layer is not in proximity to said oil.

18. The container of claim 6 wherein said second layer is formed from a polymer and said polymer of said first layer is different from said polymer of said second layer.

19. The container of claim 18 wherein said first layer, when in contact with said oil, is less susceptible to environmental stress cracking than when out of contact with said oil.

20. The container of claim 18 wherein said polymer of said second layer is a polypropylene polymer.

21. The container of claim 20 wherein said first layer, when in contact with said oil, is less susceptible to environmental stress cracking than when out of contact with said oil.

22. The container of claim 20 wherein said first layer has a density of at least about 0.957 gm./cc.

23. The container of claim 22 wherein said first layer has a density of a t least about 0.960 gm./cc.

24. The container of claim 22 wherein said part of said wall constitutes substantially all of said wall.

25. The container of claim 24 wherein said oil is motor oil.

26. The container of claim 24 wherein said second layer forms the exterior of said part of said wall.

27. A substantially form retaining container for a fluid having a wall defining an interior and an exterior, at least a part of said wall comprising a plurality of layers including:
   (A) a first relatively stiff layer in close proximity to said interior of said container and formed from a polymer; said polymer, when in close proximity to said fluid, displaying less susceptibility to crease cracking than when out of close proximity to said fluid, said first layer being sufficiently thick so that the part of said first layer located layer away from said interior of said container has greater stiffness than said interior surface of said first layer when said first layer is in close proximity to said fluid; and
   (B) a second substantially continuous layer occurring at the portion of said part of said wall wherever said first layer occurs and being located, at said portion, toward the exterior of said container from said first layer, said second layer having less susceptibility to crease cracking than said part of said first layer located away from said interior of said container.

28. The container of claim 25 wherein the part of said first layer located away from said interior of said container has substantially the same stiffness when said first layer is in close proximity to said fluid as when said first layer is not in close proximity to said fluid.

29. The container of claim 27 wherein said fluid is a liquid.

30. The container of claim 29 wherein said first layer is in contact with said interior of said container.

31. The container of claim 30 wherein said liquid is a plasticizer for said polymer.

32. The container of claim 31 wherein said liquid is absorbed by said polymer.

33. The container of claim 32 wherein said first layer forms the majority of the thickness of said part of said wall.

34. The container of claim 33 wherein said second layer has no more than about 15 percent of the thickness of said part of said wall.

35. The container of claim 34 wherein said liquid, when absorbed by said polymer, softens said polymer.

36. The container of claim 35 wherein said polymer of said first layer is a polyethylene.

37. The container of claim 36 wherein said second layer is formed from a polyethylene polymer.

38. The container of claim 37 wherein said first layer has a greater density than said second layer.

39. The container of claim 38 wherein said second layer has a density less than about 0.955 gm./cc. and said first layer has a density greater than about 0.955 gm./cc.

40. The container of claim 39 wherein said second layer forms the exterior of said part of said wall.

41. The container of claim 39 wherein said first layer has a density of at least about 0.957 gm./cc.

42. The container of claim 41 wherein said first layer has a density of at least about 0.960 gm./cc.

43. The container of claim 41 wherein said second layer has a density of no more than about 0.950 gm./cc.

44. The container of claim 39 wherein said part of said wall constitutes substantially all of said wall.

45. The container of claim 39 wherein said second layer has greater impact resistance than said first layer when said first layer is not in proximity to said liquid.

46. The container of claim 36 wherein said second layer is formed from a polymer and said polymer of said first layer is different from said polymer of said second layer.

47. The container of claim 46 wherein said first layer, when in contact with one type of liquid is less susceptible to environmental stress cracking than when out of contact with said one type of liquid.

48. The container of claim 46 wherein said polymer of said second layer is a polypropylene polymer.

49. The container of claim 48 wherein said first layer, when in contact with one type of liquid, is less susceptible to environmental stress cracking than when out of contact with said one type of liquid.

50. The container of claim 49 wherein said first layer has a density of at least about 0.957 gm./cc.

51. The container of claim 50 wherein said first layer has a density of at least about 0.960 gm./cc.

52. The container of claim 50 wherein said part of said wall constitutes substantially all of said wall.

53. A substantially form retaining container having a wall defining an interior and an exterior, at least a part of said wall comprising a plurality of layers including:
   (A) a relatively stiff first layer;
   (B) a second substantially continuous layer occurring at the portion of said part of said wall wherever said first layer occurs and being located, at said portion, toward the exterior of said container from said first layer, said second layer having less stiffness than said first layer; and
   (C) a third substantially continuous layer occurring at the portion of said part of said wall wherever said first layer occurs and being located, at said portion, toward the interior of said container from said first layer, said third layer having less stiffness than said first layer.

54. The container of claim 53 wherein said first layer is formed from a polymer and said second layer is formed from a polymer different from said polymer of said first layer.

55. The container of claim 54 wherein said third layer is formed from a polymer different from said polymer of said first layer.

56. The container of claim 55 wherein said first layer forms the majority of the thickness of said part of said wall.

57. The container of claim 56 wherein said part of said wall includes a substantially continuous layer of fluorinated polymer located toward the interior of said third layer.

58. The container of claim 56 wherein said second layer has no more than about 15 percent of the thickness of said part of said wall.

59. The container of claim 58 wherein said third layer has no more than about 15 percent of the thickness of said part of said wall.

60. The container of claim 59 wherein said polymer of said first layer is a polyethylene.

61. The container of claim 60 wherein said first layer has a density of at least about 0.957 gm./cc.

62. The container of claim 61 wherein said first layer has a density of at least about 0.960 gm./cc.

63. The container of claim 61 wherein said second and third layers are each formed from a polyethylene polymer.

64. The container of claim 63 wherein said part of said wall includes a substantially continuous layer of fluorinated polymer located toward the interior of said third layer.

65. The container of claim 63 wherein said first layer has a greater density than either said second layer or said third layer.

66. The container of claim 65 wherein said second and third layers each has a density of no more than about 0.950 gm./cc.

67. The container of claim 60 wherein said third layer provides a barrier to the migration of the contents of said container to said first layer.

68. The container of claim 60 wherein said polymer of said second layer is a polypropylene polymer.

69. The container of claim 60 wherein said polymer of said third layer is a polypropylene polymer.

70. The container of claim 69 wherein said part of said wall includes a substantially continuous layer of fluorinated polymer located toward the interior of said third layer.

71. The container of claim 59 wherein said second layer forms the exterior of said part of said wall.

72. The container of claim 71 wherein said second layer forms the interior of said part of said wall.

73. The container of claim 59 wherein said part of said wall constitutes substantially all of said wall.

74. A substantially form retaining container having a wall defining an interior and an exterior, at least a part of said wall comprising a plurality of layers including:
(A) a first relatively stiff first layer;
(B) a second substantially continuous layer occurring at the portion of said part of said wall wherever said first layer occurs and being located, at said portion, toward the exterior of said container from said first layer, said second layer having less susceptibility to crease cracking than said first layer; and
(C) a third substantially continuous layer occurring at the portion of said part of said wall wherever said first layer occurs and being located, at said portion, toward the interior of said container from said first layer, said third layer having less susceptibility to crease cracking than said first layer.

75. The container of claim 74 wherein said first layer is formed from a polymer and said second layer is formed from a polymer different from said polymer of said first layer.

76. The container of claim 75 wherein said third layer is formed from a polymer different from said polymer of said first layer.

77. The container of claim 76 wherein said first layer forms the majority of the thickness of said part of said wall.

78. The container of claim 77 wherein said part of said wall includes a substantially continuous layer of fluorinated polymer located toward the interior of said third layer.

79. The container of claim 77 wherein said second layer has no more than about 15 percent of the thickness of said part of said wall.

80. The container of claim 79 wherein said third layer has no more than about 15 percent of the thickness of said part of said wall.

81. The container of claim 80 wherein said polymer of said first layer is a polyethylene.

82. The container of claim 80 wherein said first layer has a density of at least about 0.960 gm./cc.

83. The container of claim 82 wherein said second and third layers are each formed from a polyethylene polymer.

84. The container of claim 83 wherein said part of said wall includes a substantially continuous layer of fluorinated polymer located toward the interior of said third layer.

85. The container of claim 83 wherein said first layer has a greater density than either said second layer or said third layer.

86. The container of claim 85 wherein said second and third layers each has a density of no more than about 0.950 gm./cc.

87. The container of claim 81 wherein said third layer provides a barrier to the migration of the contents of said container to said first layer.

88. The container of claim 81 wherein said polymer of said second layer is a polypropylene polymer.

89. The container of claim 88 wherein said polymer of said third layer is a polypropylene polymer.

90. The container of claim 89 wherein said part of said wall includes a substantially continuous layer of fluorinated polymer located toward the interior of said third layer.

91. The container of claim 80 wherein said second layer forms the exterior of said part of said wall.

92. The container of claim 91 wherein said second layer forms the interior of said part of said wall.

93. The container of claim 80 wherein said part of said wall constitutes substantially all of said wall.

94. The container of claim 93 wherein said first layer, when in contact with at least one type of liquid, is less susceptible to environmental stress cracking than when out of contact with said one type of liquid.

95. The container of claim 93 wherein said second layer has greater impact resistance than said first layer when said first layer is not in proximity to said oil.

96. A method for molding a substantially form retaining container for oil having a wall defining an interior and an exterior comprising:
(A) forming a first relatively stiff layer in close proximity to said interior of said container from a polymer; said polymer, when on the interior surface of said layer and in close proximity to said oil, absorbing said oil, and after absorbing said oil, displaying less stiffness than when out of close proximity to said oil, said first layer being formed sufficiently thick so that the part of said first layer located layer away from said interior of said container has greater stiffness than said interior surface of said first layer when said first layer is in close proximity to said oil; and
(B) forming a second substantially continuous layer at the portion of said wall wherever said first layer occurs, and at said portion, toward the exterior of said container from said first layer, said second layer having less stiffness than said part of said first layer located away from said interior of said container.

97. The method of claim 96 wherein said first layer is formed with the part of said first layer located away from said interior of said container having substantially the same stiffness when said first layer is in close proximity to said oil as when said first layer is not in close proximity to said oil.

98. The method of claim 96 wherein said first layer is formed as the interior surface of said container.

99. The method of claim 98 wherein a majority of the thickness of said part of said wall is formed from said first layer.

100. The method of claim 99 wherein said first layer is formed from a polyethylene polymer.

101. The method of claim 100 wherein said second layer is formed from a polyethylene polymer.

102. The method of claim 101 wherein the exterior of said part of said wall is formed from said second layer.

103. The method of claim 102 wherein no more than about 15 percent of the thickness of said part of said wall is formed from said second layer.

104. The method of claim 103 wherein substantially all of said wall is formed from said part of said wall.

105. The method of claim 104 wherein said second layer has greater impact resistance than said first layer when said first layer is not in proximity to said oil.

106. The method of claim 101 wherein said first layer is formed with a greater density than said second layer.

107. The method of claim 100 wherein said second layer is formed from a polymer different from said polymer from which said first layer is formed.

108. The method of claim 107 wherein said second layer is formed from a polypropylene polymer.

109. A method for molding a substantially form retaining container for fluid having a wall defining an interior and an exterior comprising:
(A) forming a first relatively stiff layer in close proximity to said interior of said container from a polymer; said polymer, when in close proximity to said fluid, displaying less susceptibility to crease cracking than when out of close proximity to said fluid, said first layer being formed sufficiently thick so that the part of said first layer located layer away from said interior of said container has greater stiffness than said interior surface of said first layer when said first layer is in close proximity to said fluid; and
(B) forming a second continuous layer at the portion of said wall wherever said first layer occurs, and at said portion, toward the exterior of said container from said first layer, said second layer having substantially less susceptibility to crease cracking than said part of said first layer located away from said interior of said container.

110. The method of claim 109 wherein said first layer is formed with the part of said first layer located away from said interior of said container having substantially the same stiffness when said first layer is in close proximity to said fluid as when said first layer is not in close proximity to said fluid.

111. The method of claim 109 wherein said fluid is a liquid.

112. The method of claim 111 wherein said liquid is a plasticizer for said polymer.

113. The method of claim 112 wherein said liquid is absorbed by said polymer.

114. The method of claim 113 wherein a majority of the thickness of said part of said wall is formed from said first layer.

115. The method of claim 114 wherein said polymer is a polyethylene.

116. The method of claim 115 wherein said liquid, when absorbed by said polymer, softens said polymer.

117. The method of claim 116 wherein said second layer is formed from a polyethylene polymer.

118. The method of claim 111 wherein said first layer is formed as the interior surface of said container.

119. The method of claim 118 wherein the exterior of said part of said wall is formed from said second layer.

120. The method of claim 119 wherein said first layer is formed with a greater density than said second layer.

121. The method of claim 120 wherein no more than about 15 percent of the thickness of said part of said wall is formed from said second layer.

122. The method of claim 121 wherein substantially all of said wall is formed from said part of said wall.

123. The method of claim 122 wherein said second layer has greater impact resistance than said first layer when said first layer is not in proximity to said oil.

124. The method of claim 123 wherein said first layer is formed such that, when in contact with at least one type of liquid, is less susceptible to environmental stress cracking than when out of contact with said one type of liquid.

125. The method of claim 117 wherein said second layer is formed from a polymer different from said polymer from which said first layer is formed.

126. The method of claim 125 wherein said second layer is formed from a polypropylene polymer.

127. A method for molding a substantially form retaining having a wall defining an interior and an exterior comprising:
(A) forming a first relatively stiff layer;
(B) forming a second substantially continuous layer at the portion of said wall wherever said first layer occurs, and at said portion, toward the exterior of said container from said first layer, said second layer having less stiffness than said first layer; and
(C) forming a third substantially continuous layer at the portion of said wall wherever said first layer occurs, and at said portion, toward the interior of said container from said first layer, said third layer having less stiffness than said first layer.

128. The container of claim 127 wherein said first layer is formed from a polymer and said third layer is formed from a polymer different from said polymer of said first layer.

129. The method of claim 128 wherein said second layer is formed from a polymer different from said polymer from which said first layer is formed.

130. The method of claim 128 wherein said third layer is a barrier to the migration of the contents of said container to said first layer.

131. The method of claim 129 wherein a majority of the thickness of said part of said wall is formed from said first layer.

132. The method of claim 131 further including forming a substantially continuous layer of fluorinated polymer toward the interior of said third layer.

133. The method of claim 131 wherein no more than about 15 percent of the thickness of said part of said wall is formed from said second layer.

134. The method of claim 133 wherein no more than about 15 percent of the thickness of said part of said wall is formed from said third layer.

135. The method of claim 134 wherein said first layer is formed from a polyethylene polymer.

136. The method of claim 135 wherein said second layer is formed from a polyethylene polymer.

137. The method of claim 136 further including forming a substantially continuous layer of fluorinated polymer toward the interior of said third layer.

138. The method of claim 136 wherein said first layer is formed with a greater density than said second layer.

139. The method of claim 135 wherein said second layer is formed from a polypropylene polymer.

140. The method of claim 139 wherein said third layer is formed from a polypropylene polymer.

141. The method of claim 140 further including forming a substantially continuous layer of fluorinated polymer toward the interior of said third layer.

142. The method of claim 134 wherein the exterior of said part of said wall is formed from said second layer.

143. The method of claim 142 wherein the exterior of said part of said wall is formed from said third layer.

144. The method of claim 143 wherein said first layer is formed such that, when in contact with at least one type of liquid, is less susceptible to environmental stress cracking than when out of contact with said one type of liquid.

145. A method for molding a substantially form retaining having a wall defining an interior and an exterior comprising:

(A) forming a first relatively stiff layer;

(B) forming a second substantially continuous layer at the portion of said wall wherever said first layer occurs, and at said portion, toward the exterior of said container from said first layer, said second layer having less susceptibility to crease cracking than said first layer; and (C) forming a third substantially continuous layer at the portion of said wall wherever s aid first layer occurs, and at said portion, toward the interior of said container from said first layer, said third layer having less susceptibility to crease cracking than said first layer.

146. The container of claim 145 wherein said first layer is formed from a polymer and said third layer is formed from a polymer different from said polymer of said first layer.

147. The method of claim 146 wherein said second layer is formed from a polymer different from said polymer from which said first layer is formed.

148. The method of claim 146 wherein said third layer is a barrier to the migration of the contents of said container to said first layer.

149. The method of claim 147 wherein a majority of the thickness of said part of said wall is formed from said first layer.

150. The method of claim 149 further including forming a substantially continuous layer of fluorinated polymer toward the interior of said third layer.

151. The method of claim 149 wherein no more than about 15 percent of the thickness of said part of said wall is formed from said second layer.

152. The method of claim 151 wherein no more than about 15 percent of the thickness of said part of said wall is formed from said third layer.

153. The method of claim 152 wherein said first layer is formed from a polyethylene polymer.

154. The method of claim 153 wherein said second layer is formed from a polyethylene polymer.

155. The method of claim 154 further including forming a substantially continuous layer of fluorinated polymer toward the interior of said third layer.

156. The method of claim 154 wherein said first layer is formed with a greater density than said second layer.

157. The method of claim 153 wherein said second layer is formed from a polypropylene polymer.

158. The method of claim 157 wherein said third layer is formed from a polypropylene polymer.

159. The method of claim 158 further including forming a substantially continuous layer of fluorinated polymer toward the interior of said third layer.

160. The method of claim 152 wherein the exterior of said part of said wall is formed from said second layer.

161. The method of claim 160 wherein the exterior of said part of said wall is formed from said third layer.

162. The method of claim 152 wherein said first layer is formed such that, when in contact with at least one type of liquid, is less susceptible to environmental stress cracking than when out of contact with said one type of liquid.

* * * * *